United States Patent [19]
Lange

[11] Patent Number: 6,073,659
[45] Date of Patent: Jun. 13, 2000

[54] METHOD AND APPARATUS OF REMOVING LIQUID FROM UNDERGROUND CAVITY BY DIRECTIONAL DRILLING

[76] Inventor: James E. Lange, P.O. Box 1670, LaPorte, Ind. 46350

[21] Appl. No.: 08/799,778

[22] Filed: Feb. 12, 1997

[51] Int. Cl.$^7$ .................................................. F16L 9/00
[52] U.S. Cl. ................ 138/177; 138/178; 138/DIG. 11; 166/233; 166/234; 166/235; 405/45; 405/128
[58] Field of Search .................... 138/105, 119, 138/177, 178, 103, DIG. 11; 166/233, 234, 235; 405/43, 45, 46, 48, 128

[56] References Cited

U.S. PATENT DOCUMENTS

| | | | |
|---|---|---|---|
| 1,785,071 | 2/1929 | Coberly | 138/177 |
| 3,275,081 | 9/1966 | Beylik | 166/235 |
| 3,709,293 | 1/1973 | Layne, II et al. | 166/233 |
| 3,753,352 | 8/1973 | McNally | 138/178 |
| 4,133,379 | 1/1979 | Nuzman et al. | 166/234 |
| 4,163,619 | 8/1979 | Fales | 138/103 |
| 4,246,936 | 1/1981 | Luz et al. | 405/45 |
| 5,046,892 | 9/1991 | Kothman | 138/103 |

Primary Examiner—Denise L. Ferensic
Assistant Examiner—James F. Hook
Attorney, Agent, or Firm—Baker & Daniels

[57] ABSTRACT

Underground cavities containing liquid contaminants are remediated by drilling directionally through the cavity and then pulling back pipe with a slotted section extending through the cavity. The pipe is supplied on reels in lengths much longer than in the prior art, thus avoiding the joining by butt welding of successive short lengths of pipe as in the prior art. Slots are preferably cut parallel to the axis of the pipe or at a angle in respect to the axis instead of being cut radially as in the prior art, so that a much greater portion of the pipe circumference remains joined together, thereby substantially increasing the axial strength of the pipe.

11 Claims, 6 Drawing Sheets

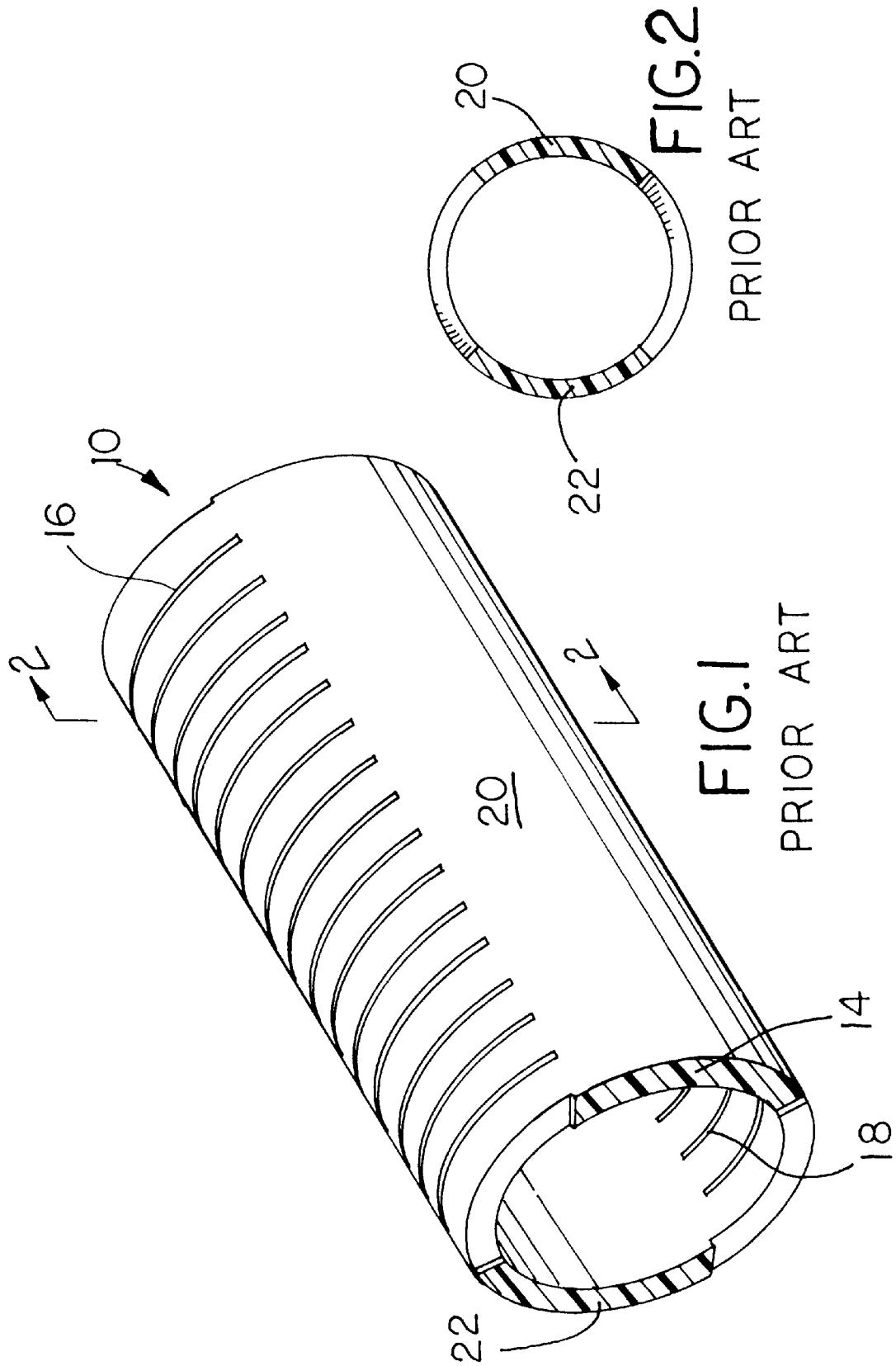

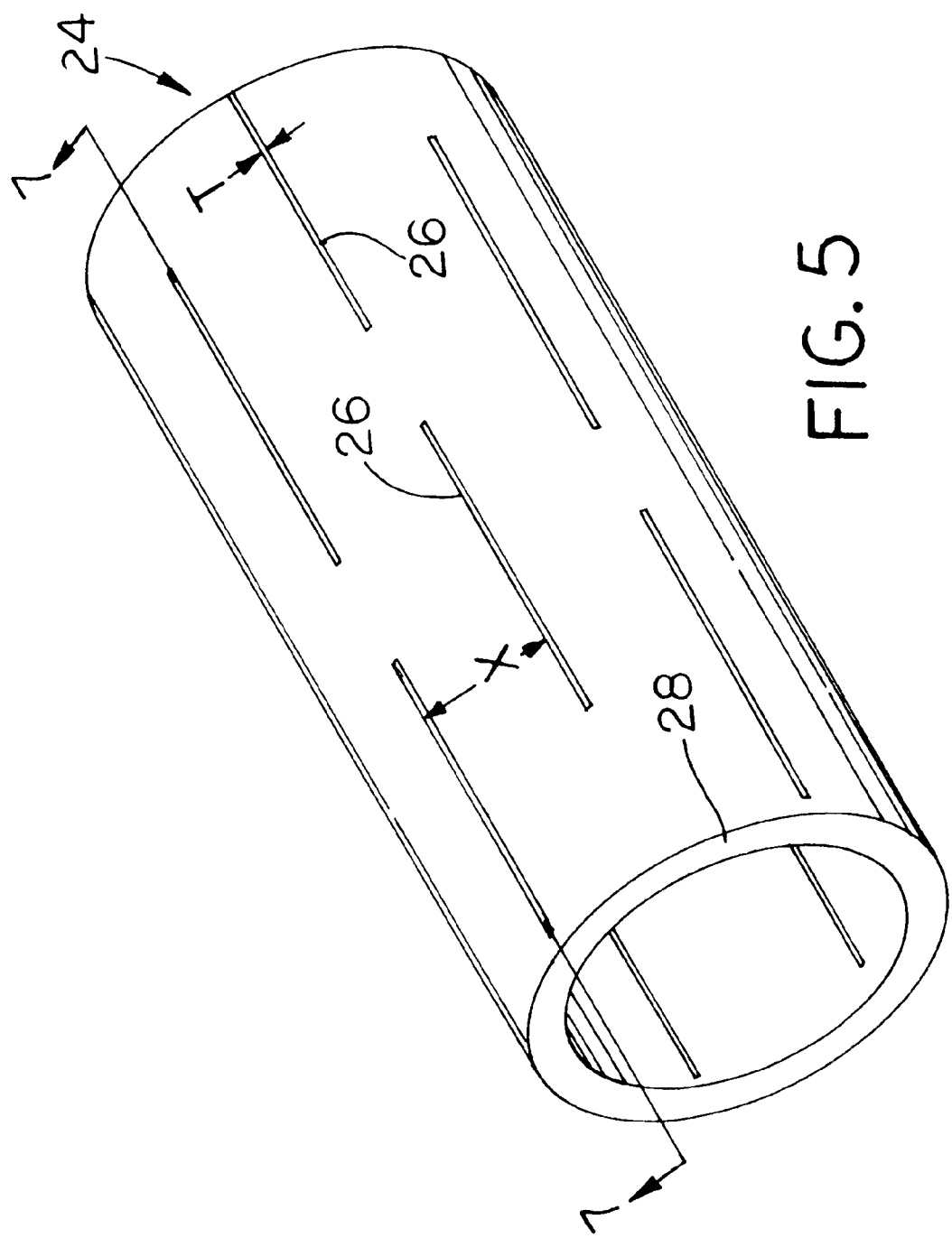

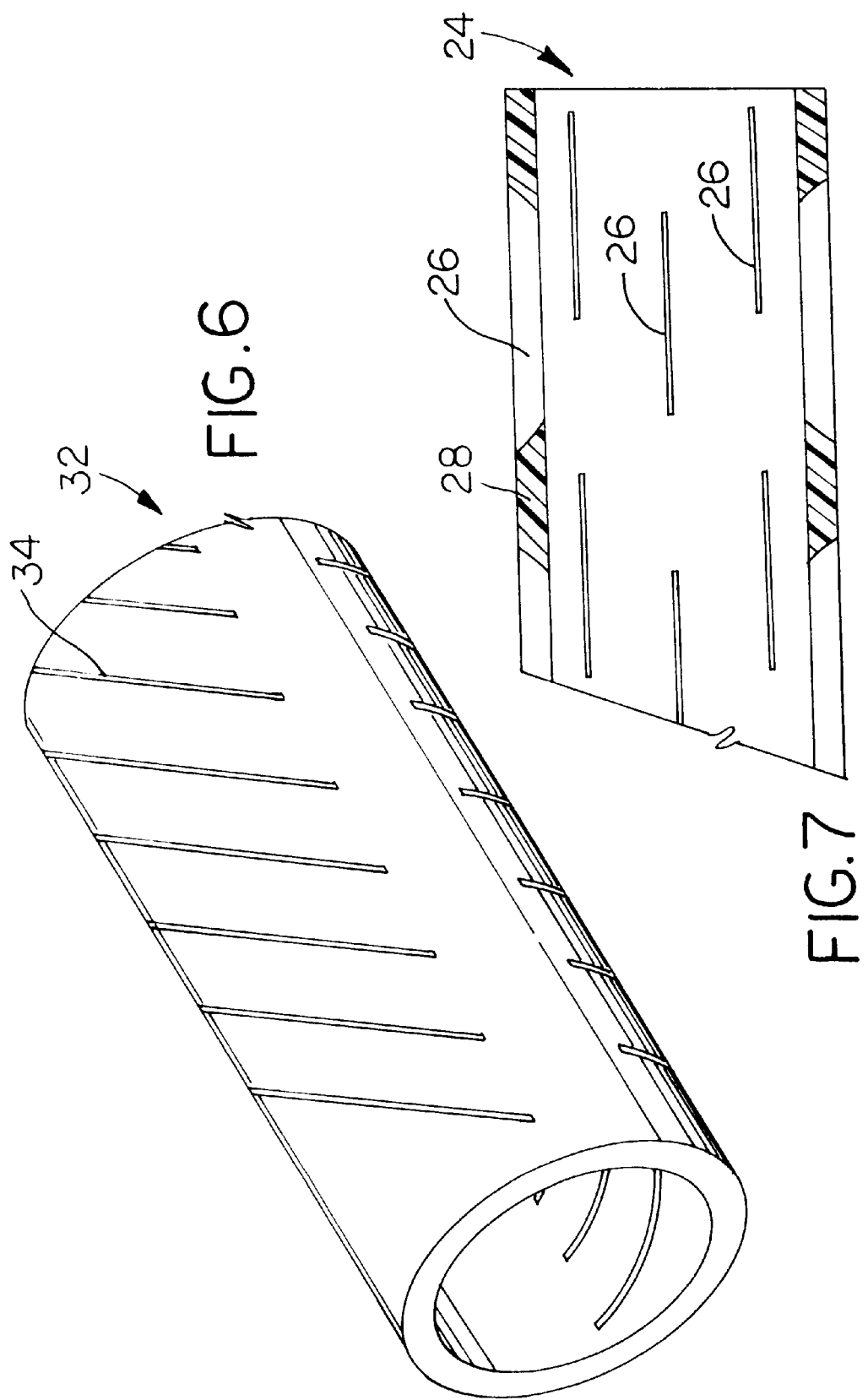

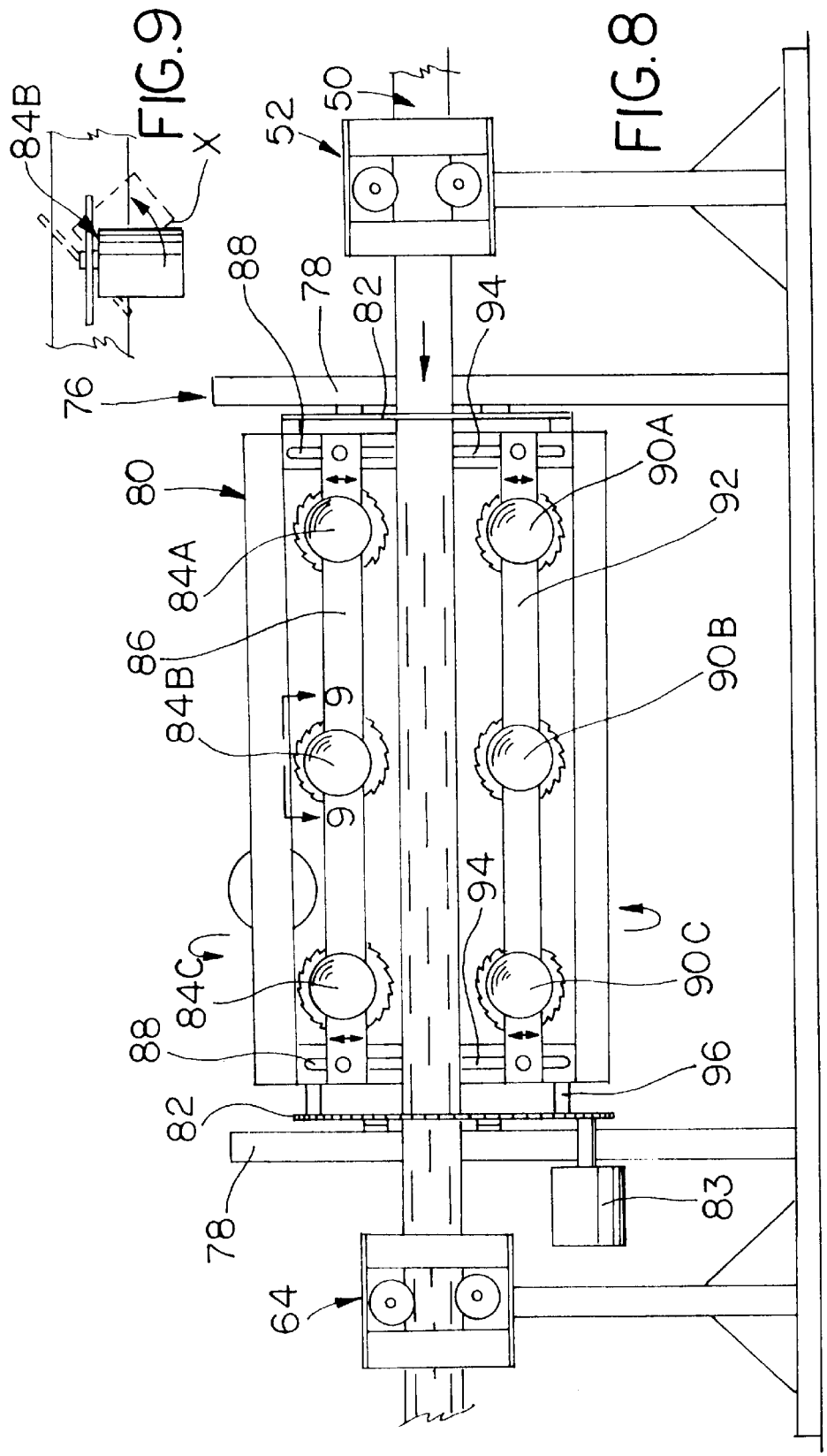

METHOD AND APPARATUS OF REMOVING LIQUID FROM UNDERGROUND CAVITY BY DIRECTIONAL DRILLING

This invention relates to a method of removing contaminated liquids from an underground cavity using directional drilling, slotted pipe used in such drilling operations, and a method for manufacturing the slotted pipe.

BACKGROUND OF THE INVENTION

Contaminated liquid commonly must be removed from underground cavities. Contaminated materials that were poured on the ground many years ago eventually combine with ground water and collect in underground cavities and must be removed. The cavities are located by drilling exploratory wells at intervals over the site where contaminated cavities may exist and then drilling remediation wells to remove the contaminated deposits located by the exploratory wells. Since many remediation wells must be drilled if drilled vertically, it has been common to employ horizontal or directional drilling in the remediation of contaminated liquid underground deposits. Normally, a directional drilling rig is set up at a first station, which is normally a site displaced from the cavity containing the deposits. Drilling at an angle is effected until the cavity is reached, and then horizontal drilling is employed through the cavity. Angle drilling is again employed until the drill string exits the ground at a second station displaced from the first station. Plastic pipe, such as HDPE plastic pipe, is then pulled back through the bore hole formed by drilling. The HDPE pipe includes a slotted section which extends through the cavity. A pump connected to the pipe draws contaminated liquid out of the cavity and into the pipe through the slotted section. The contaminated liquid is then drawn out of the pipe at one of the stations and disposed of properly. Accordingly, many cavities can be remediated by using directional drilling instead of multiple vertical wells.

The pipe required in remediation is normally supplied in sections of 10–20 feet. These sections are butt welded using known technology as the pipe is pulled through the bore hole. Short sections of pipe have been necessary, since known manufacturing processes have required that slots be cut in the pipe at substantially right angles to the axis of the pipe. Pipe sections with these radial slots are significantly weaker than unslotted pipe, since only the uncut part of the circumference of the pipe is available to resist the pulling forces. Since pulling long lengths of pipe increases the weight of the pipe that must be pulled through the bore hole, only short lengths of pipe could be added at the station from which the pipe was being pulled, even if slotted pipe in longer lengths would have been available. A butt weld is typically employed to connect adjacent pipe sections. However, butt welding is a difficult, time consuming and expensive process, and therefore unless the welder is very skilled a butt weld may undesirably restrict the pipe diameter and/or become a weak link in the pipe.

BRIEF SUMMARY OF THE INVENTION

According to the present invention, pipe with a slotted section is supplied to the jobsite on reels and is uncoiled from the reels as it is pulled through the borehole. Ideally, the reel can store a sufficient length of pipe to pull through the entire borehole, but if necessary a separate reel can be supplied and the ends of the pipe on the two reels may be butt welded together. In any case, the lengths of pipe supplied on reels are many times longer than the relatively short lengths of pipe previously used. Furthermore, instead of being cut radially, the slots are cut offset with respect to the radius of the pipe, or may be cut extending parallel to the axis of the pipe, and spaced circumferentially from one another. The axially extending slots provide the strongest pipe, since they have a far greater portion of the pipe connected together than the radially extending slots used in the prior art. The offset slots, depending upon their angle, provide a pipe of intermediate strength between the prior art radially cut slots and the slots cut parallel to the axis of the pipe. Accordingly, the pipe according to the invention is much less likely to break than the prior art pipes, and this is particularly important because the pipe supplied on reels has a much larger length, so that the weight of pipe to be pulled is greater than in the prior art. A method and machine are disclosed for cutting the longitudinally extending slots on a continuous length of pipe.

BRIEF DESCRIPTION OF THE DRAWINGS

These and other advantages of the present invention will become apparent from the following description, with reference to the accompanying drawings, in which:

FIG. 1 is a view in perspective, partly in section, of a prior art pipe having radially extending slots;

FIG. 2 is view taken substantially along line 2—2 of FIG. 1;

FIG. 5 is a view in perspective of segment of pipe according to the teaching of the present invention having axially extending slots;

FIG. 6 is a view similar to FIG. 5, but illustrates a pipe having slots cut in a direction skewed with respect to the axis of the pipe, FIG. 7 is fragmentary cross sectional view taken substantially along lines of FIG. 5;

FIG. 8 is a view similar to FIG. 4 but illustrating an alternate embodiment of the machine used to cut slots in pipe; and FIG. 9 is a fragmentary view taken substantially along lines 9—9 of FIG. 8.

DETAILED DESCRIPTION

Figure 3:
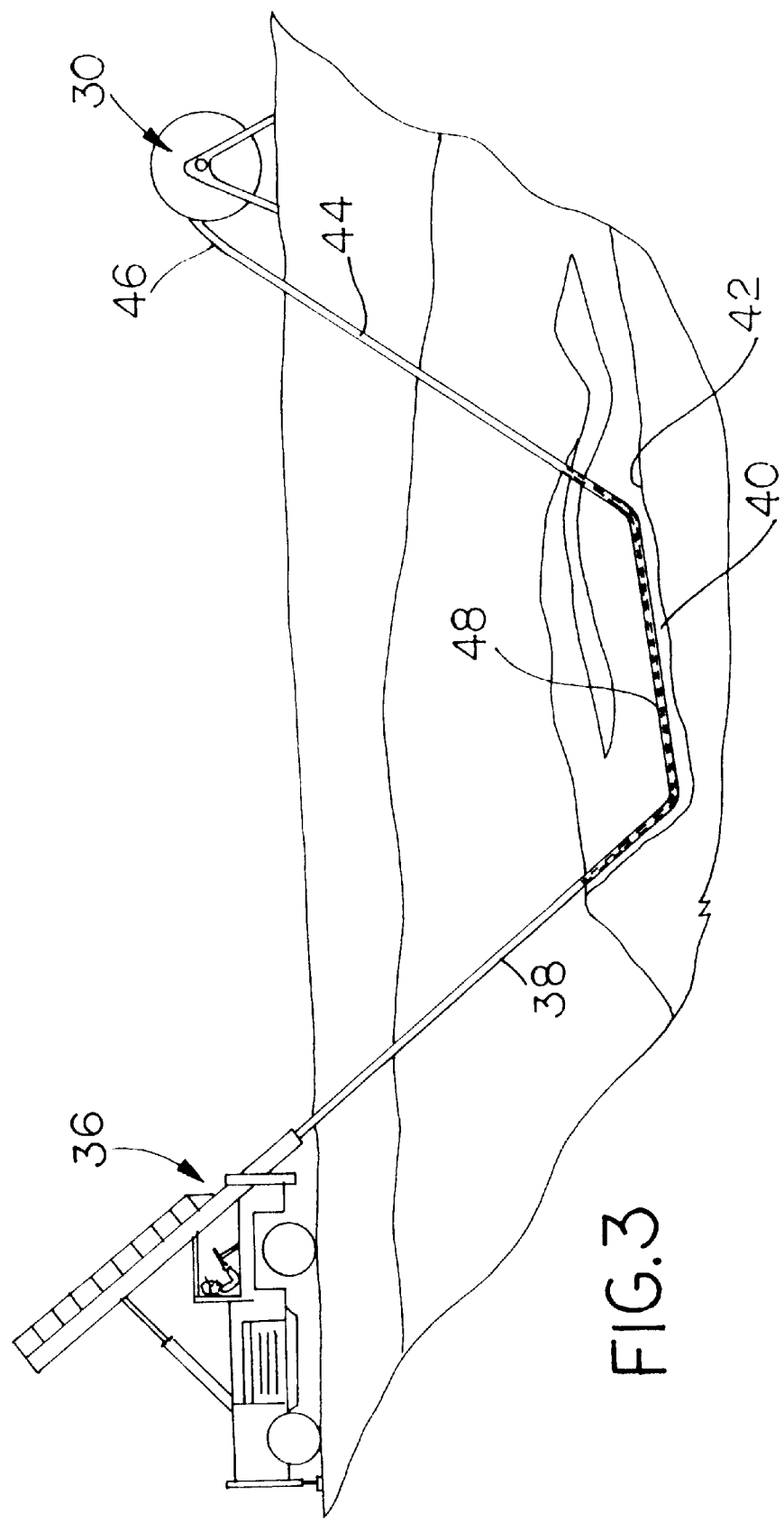
FIG. 3 is diagrammatic illustration of the manner in which pipe pursuant to the present invention is installed to remediate contaminating liquids from an underground cavity.

Referring now to FIG. I of the drawings, a segment of prior art slotted pipe used in directional drilling for remediation of liquid from contaminated underground cavities is generally indicated by the numeral 10. Pipe 10 includes an outer circumferential wall 14 that has a first series of axially spaced, circumferentially extending, radially inward projecting slots 16 and a second set of similar slots 18 in that portion of the pipe diametrically opposed to the slots 16. Accordingly, the only portions of the pipe resisting axial forces applied thereto, such as occurs when pulling the pipe through a borehole, are those portions 20 and 22 of the pipe extending between the sets of slots 16 and 18. Since a substantial portion of the pipe has been cut away to form the slots 16 and 18, and only those portions 20 and 22 are available to resist pulling forces exerted thereon, the pipe is substantially weakened as compared to unslotted pipe.

Because prior art machines for cutting the slots 16 and 18 can handle only short lengths of pipe, the common practice of the prior art was to supply a length of the pipe 10 in 10–20 foot segments. These segments were butt welded together as the pipe was pulled through the borehole. Unfortunately, when pulling longer lengths of pipe through a borehole the weight of the pipe from the accumulated sections was likely to cause the butt weld to fail. These longer lengths were also likely to cause the pipe section to fail because of decreased cross-sectional area provided by the segments 20 and 22 available to resist the pulling forces applied to the pipe 10.

Referring now to FIGS. 5 and 7, a segment of pipe 24 made pursuant to the teachings of the present invention is provided with axially extending, circumferentially spaced slots 26 in the circumferential wall 28 of the segment 24. The slots 26 have a relatively small thickness t. Accordingly, the segment 24 resists pulling or axially applied forces through all those areas of the pipe X interconnecting the slots 26. The area of the slots 26 per given unit of pipe is designed to be the same as the area of the slots 16 and 18 in the prior art pipe. However, the segment 24 is able to withstand far greater axial forces than is the segment 10 because the sum of the thicknesses t of the slots spaced around the outer wall 28 is much less than the portion of the circumference of the segment 10 of the prior art pipe cut by the slots 16 and 18. Accordingly, pipe incorporated a slotted segments may be pulled in greater increments without danger of breaking than the prior art pipe and it is possible to provide a coil of pipe such as the coil 30 in FIG. 3. Alternatively, and referring to FIG. 6, a pipe segment 32 may have slots 34 which, are offset from radial. The ability of the pipe of FIG. 6 to withstand pulling forces is less than the pipe in FIG. 5 but greater than the pipe of FIG. 1.

Referring to FIG. 3, a conventional directional drilling rig generally indicated by the numeral 36 is parked adjacent a first station and a reel of pipe 30 is placed near a second station. The directional drilling rig, using drill rod and boring tools (not shown), drills a borehole having a downwardly sloping portion 38, a laterally extending portion 40 which extends through the cavity 42 containing the liquid contaminants, and an upwardly extending portion 44. Note that although laterally extending portion 40 shown in FIG. 3 appears to be substantially horizontal, the rig 36 is equally useful and applicable in situations wherein the lateral portion 40 must be sloped to accommodate a sloping cavity 42. After the drilling tool reaches the surface at the station at which the pipe reel 30 is located, the boring tool is removed and a reamer is mounted on the drill stem a, and pipe from the reel 30 is coupled to the reamer using a swivel and duct puller (not shown) as is commonly employed in the art. As the pipe is pulled through the borehole, the drill rod rotates the reamer so that the reamer enlarges the borehole sufficiently to accommodate the pipe 46 unwound off of the reel 30. The pipe 46 includes a perforated section 48, which is measured to be placed in that portion 40 of the borehole traversing the cavity 42 containing the contaminated liquid. Since substantial axial directed forces must be applied to the pipe it is necessary that pipe be as strong as possible, the slots being necessary for contaminated liquid to be able to flow into the pipe and to be pumped out.

Referring now to FIG. 5, the method in which the slots 26 are cut in the pipe 50 will be described in detail. The pipe 50 is taken from a supply reel (not shown) and is threaded through a straightening roller stand generally indicated by the numeral 52. The roller stand 52 includes cooperating sets of vertical rollers 54, 56 and horizontal rollers 58. The roller stand 52 holds and straightens the pipe 50 as it is supplied from the aforementioned supply reel. The pipe 50 is then threaded through a circumferentially extending cuff 60 of a fixture generally indicated by the numeral 62, which will be described in detail hereinafter. The pipe 50 is then threaded through a second roller stand 64, which is identical to the stand 52. The stands 52 and 64, in addition to straightening the pipe 50, hold the pipe 50 in position while cutting is effected by a circular saw 66 which is mounted on a saw support 68. The cuff 60 is releaseably secured to a section of the pipe 50 by appropriate setscrews (not shown). The saw support 68 is rotatable relative to the cuff 60 as indicated by the arrows A, so that the saw 66 can be indexed circumferentially about the pipe 50 relative to the cuff 60 to enable the cutting of slots around the circumference of the pipe. Preferably, the saw support 68 is also movable in a direction parallel to the axis of the pipe as indicated by the arrow B so that the saw 66 may be indexed axially to cut adjacent slots without having to advance the pipe 50 relative to the roller stands 52, 64. After the slots are cut at a given location, the cuff 60 is loosened to permit movement of the pipe relative to the cuff in the direction indicated by the arrow C. When the pipe is then indexed the proper amount, the cuff 60 is again tightened on the pipe and the cutting process is repeated. The saw 66 is moveable toward and away from the circumferential surface of the pipe as indicated by the arrow D so that slots are cut by moving the saw 66 relative to the outer circumferential surface of the pipe. As the slots are cut and the pipe 50 is advanced through the roller stands 52 and 64, pipe 50 is rolled upon a takeup reel 70. A tensioner and guide 72 patrols the pipe 50 as it is wound on the takeup reel 70. The takeup reel 70 after slotting of the pipe may be removed from the support fixture 74 and stored until it is to be used at a drilling operation of the type indicated in FIG. 3.

Figure 4:
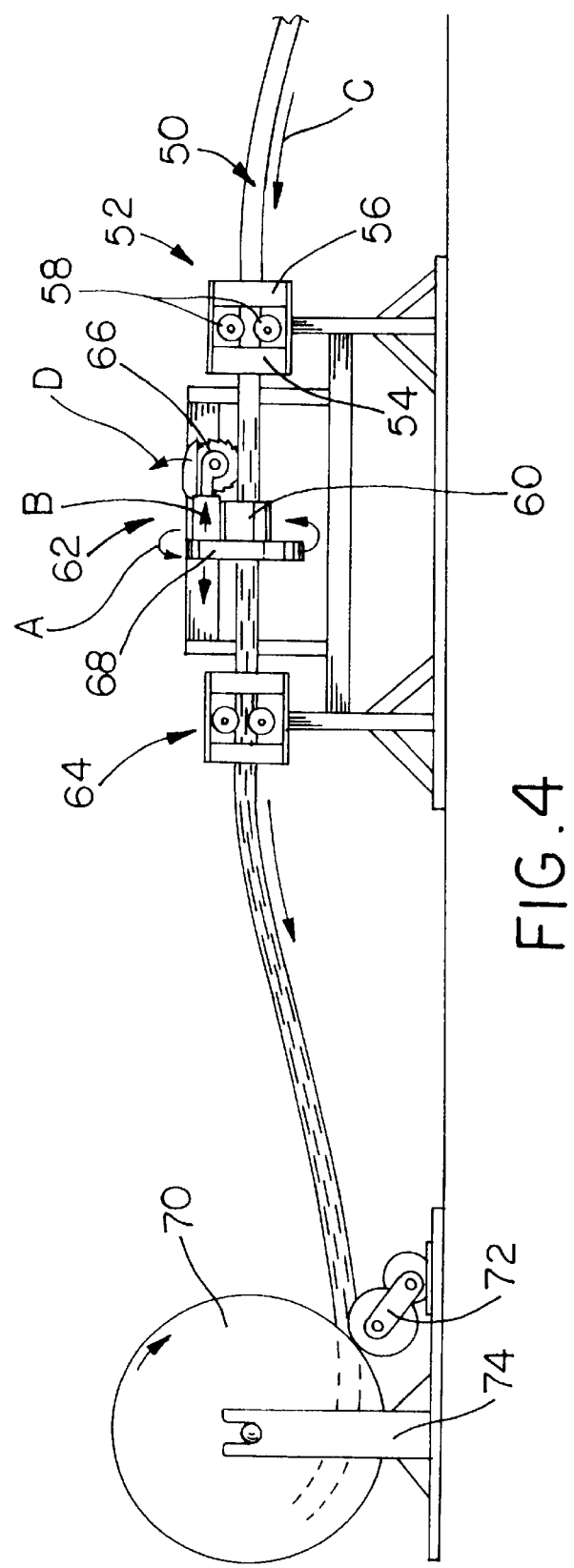
FIG. 4 is a diagrammatic illustration of one form of machine used to produce the slots in the pipe used in FIG. 3.

Referring now to FIG. 8, another method for performing cuts generally parallel to the axis of the pipe is effected by use of a device generally indicated by the numeral 76 which supports multiple saws for effecting more rapid slotting of the pipe 50 than is possible with the apparatus indicated in FIG. 4. Device 76 includes supports 78 which rotatably mount a frame generally indicated by the numeral 80. The frame 80 includes end plates 82, one of which is driven by a motor 83 to index the frame 80 about the circumference of the pipe 50, which is threaded through the end plates 82. Multiple motor driven saws 84a, 84b, and 84c are mounted on reciprocating frame member 86 which is moveable in slots 88 of main frame member 80 toward and away from the outer circumferential surface of the pipe 50. Similarly, saws 90a, 90b, and 90c are mounted on reciprocating frame member 92 which is slideably mounted and guided in slots 94 on main frame member 80 so that the reciprocating frame member 92 and saws 90a–c be moved toward and away from that of circumferential surface of pipe 50.

Accordingly, diagrammatically opposite slots are cut in the pipe 50 by the saws 84a–c and the saws 90a–c. The main frame 80 can then be rotated by use of the motor 83 to another position, wherein additional cuts of slots are cut in the pipe 50. Furthermore, the main frame 80 may be mounted for axial movement relative to the pipe along support 96 to cut adjacent axially offset slots in the pipe without having to index the pipe relative to the roller stands 52 and 64. The pipe 50 is supplied from a supply reel, and reeled on a takeup reel, in exactly the same manner as that illustrated in FIG. 4.

As shown in FIG. 9, each of the saws 84a–c and 90a–c may be pivotally mounted on their corresponding reciprocating frame member 86 or 92, as indicated by the arrow X. Accordingly, the saws may be canted relative to their corresponding reciprocating frame 86 or 92, to permit slots to be cut on the pipe 50 on an angle with respect to the axis of pipe 50, in the orientation generally shown in FIG. 6.

I claim:

1. Method of removing liquid from an underground cavity comprising the steps of drilling downwardly from a first station on ground, then laterally through said cavity, and then upwardly to a second station on ground displaced from said first section, providing a reel of semi-flexible pipe having a perforated section at said second station, pulling said pipe from said second station by unreeling the pipe from said real and pulling said pipe toward said first station from said second station and through said cavity until the perforated section is disposed in said cavity, and then pumping liquid from said cavity into said pipe through the perforations defining said perforated section.

2. Method of removing liquid from an underground cavity as claimed in claim 1, wherein said perforations are slots extending through said pipe and oriented in a direction other than along a radius of said pipe.

3. Method of removing liquid from an underground cavity as claimed in claim 2, wherein said slots are spaced circumferentially around said pipe and extend substantially parallel to the axis of said pipe.

4. Method of removing liquid from an underground cavity as claimed in claim 3, wherein said slots are cut into said pipe.

5. Method of removing liquid from an underground cavity as claimed in claim 1, wherein said pipe includes a circumferentially extending wall circumscribing an axis, said slots extending in a direction skewed with respect to said axis.

6. Method of removing liquid from an underground cavity as claimed in claim 1, wherein said pipe includes a circumferentially extending wall circumscribing an axis, said slots extending in a direction substantially parallel with respect to said axis and offset circumferentially from one another.

7. Pipe for use in directional drilling wherein an axial force is applied to pull the pipe through a borehole drilled in the ground downwardly from a first station on the ground then laterally through an underground cavity and then upwardly to a second station on the ground displaced from said first section said pipe including a pair of imperforate sections and a perforated section between said imperforate sections and extending through said underground cavity when the pipe is installed in the borehole, said perforated section being defined by elongated slots, said perforated section defining axially extending solid portions on the pipe between said slots said perforated section of said pipe being defined by a circumferentially extending wall circumscribing an axis, said circumferentially extending wall of said perforated section having a substantially smooth outer surface to minimize interference between the pipe and the borehole as the pipe is pulled through the borehole, said slots extending through said wall other than in a transverse plane with respect to said axis to permit said solid sections of the pipe to provide sufficient axial strength to permit said pipe to be pulled through said borehole without breaking.

8. Pipe as claimed in claim 7, wherein said slots extend in a direction skewed with respect to said axis and offset circumferentially from one another.

9. Pipe as claimed in claim 7, wherein said pipe is wound on a reel and is pulled off of the reel when the pipe is pulled through the borehole.

10. Pipe as claimed in claim 7, wherein said slots extend in a direction substantially parallel with respect to said axis.

11. Pipe as claimed in claim 10, wherein said slots are offset circumferentially from one another.

\* \* \* \* \*